(12) United States Patent
Caroselli

(10) Patent No.: US 11,370,140 B2
(45) Date of Patent: Jun. 28, 2022

(54) MACHINE WITH INTERCHANGEABLE TOOLS FOR THE WORKING OF SHEET MATERIALS

(71) Applicant: SASSOMECCANICA S.P.A., Monteprandone (IT)

(72) Inventor: Tommaso Caroselli, San Benedetto del Tronto (IT)

(*) Notice: Subject to any disclaimer, the term of this patent is extended or adjusted under 35 U.S.C. 154(b) by 282 days.

(21) Appl. No.: 16/558,793

(22) Filed: Sep. 3, 2019

(65) Prior Publication Data

US 2020/0078977 A1 Mar. 12, 2020

(30) Foreign Application Priority Data

Sep. 10, 2018 (IT) .................. 102018000008474

(51) Int. Cl.
| | |
|---|---|
| *B26D 7/26* | (2006.01) |
| *B26F 3/00* | (2006.01) |
| *B26D 1/18* | (2006.01) |
| *B23P 23/02* | (2006.01) |
| *B28D 1/04* | (2006.01) |
| *B28D 1/22* | (2006.01) |

(52) U.S. Cl.
CPC ............ *B26D 7/2614* (2013.01); *B23P 23/02* (2013.01); *B26D 1/185* (2013.01); *B26F 3/004* (2013.01); *B28D 1/043* (2013.01); *B28D 1/22* (2013.01)

(58) Field of Classification Search
CPC ...... B26D 7/26; B26D 7/2614; B26D 7/2621; B26D 2007/2657; B26D 1/18; B26D 1/185; B23P 23/00; B23P 23/02; B23P 23/04; B23P 23/06; B26F 3/00; B26F 3/004; B26F 1/26; B24C 5/02; B24C 5/04; B28D 1/04; B28D 1/043; B23D 45/00; B23D 45/02; B23D 45/021; B23D 45/024; B23D 45/027
USPC ................................................ 83/177
See application file for complete search history.

(56) References Cited

U.S. PATENT DOCUMENTS

| | | | |
|---|---|---|---|
| 9,409,242 B2* | 8/2016 | Guazzoni ........... | B28D 1/043 |
| 9,573,263 B2 | 2/2017 | Bowles et al. | |
| 10,494,131 B2* | 12/2019 | Mistyurik ........... | B26D 3/085 |

(Continued)

FOREIGN PATENT DOCUMENTS

| | | | | |
|---|---|---|---|---|
| DE | 3807102 C1 | 4/1989 | | |
| EP | 2983879 A1* | 2/2016 | ............ | B28D 1/043 |

(Continued)

OTHER PUBLICATIONS

Search Report Form IT237 "Written Opinion" dated May 9, 2019 with reference to the Italian Patent Application No. IT 102018000008474.

*Primary Examiner* — Evan H MacFarlane
(74) *Attorney, Agent, or Firm* — Egbert, McDaniel & Swartz, PLLC

(57) ABSTRACT

An apparatus for working a sheet material has a supporting frame, a supporting head connected to the supporting frame, a plurality of tools supported on a working device, a waterjet cutter, first and second male fast-couplers, and first and second female fast-couplers disposed on the supporting head. The first male fast-coupler is disposed on the working device. The second male fast-coupler is disposed on the waterjet cutter. The first and second female couplers are configured to alternately couple the first and second male fast-couplers.

12 Claims, 18 Drawing Sheets

(56) References Cited

U.S. PATENT DOCUMENTS

| | | | | |
|---|---|---|---|---|
| 10,496,070 B2 * | 12/2019 | Shapiro | ............... | B23Q 17/22 |
| 2003/0106407 A1 * | 6/2003 | Wuensch | ............ | B23D 51/10 |
| | | | | 83/699.21 |
| 2008/0110311 A1 | 5/2008 | Stangherlin | | |
| 2014/0309784 A1 | 10/2014 | Toncelli | | |

FOREIGN PATENT DOCUMENTS

| | | |
|---|---|---|
| EP | 2998088 A1 | 3/2016 |
| WO | 2013093797 A1 | 6/2013 |

\* cited by examiner

MACHINE WITH INTERCHANGEABLE TOOLS FOR THE WORKING OF SHEET MATERIALS

BACKGROUND OF THE INVENTION

1. Field of the Invention

The present patent application for industrial invention relates to a machine used for the working of sheet materials.

In particular, the present invention relates to a numerical control machine used for the working of glass, ceramic and metal materials.

2. Description of Related Art Including Information Disclosed Under 37 CFR 1.97 and 37 CFR 1.98

The term "working" indicates any type of operation useful for obtaining a finished sheet that is ready to be used for a specific application; for instance, such operations comprise milling, cutting, engraving and polishing.

Numerical control machines for the working of sheets are known in the prior art, comprising a portal-like structure composed of a pair of lateral frames that centrally support an upper bar suitable for translating above a work bench where the sheet to be worked is disposed. A sliding trolley is provided in the bar, moving along the bar in orthogonal direction relative to the two lateral frames; the sliding trolley is joined to a mobile upright with a supporting head, which supports one or more tools used for working the sheet that is disposed on the work bench.

Said machine also comprises moving means for moving along a vertical axis that is perpendicular to the work bench in order to lower or raise the supporting head relative to the work bench.

Said supporting head may be equipped with a mandrel where a rotary tool, such as a milling cutter, a disk, a polishing device or the like is fixed.

The replacement of said tools is a cumbersome, complicated and often time-consuming operation. Additionally, specific tools are needed to lock or unlock the means used to firmly fix a tool to the supporting head.

Moreover, in addition to a rotary disk, a high-pressure waterjet can be used to perform cutting operations. In such an instance, the supporting head is equipped with a high-pressure water conduit and with a nozzle that delivers a high-pressure waterjet capable of cutting the sheet on the work bench.

It must be noted that some of the working operations are better performed with a rotary disk, which is especially suitable for performing rectilinear cuts with a very high cutting speed. On the contrary, other working operations are better performed with a waterjet cutting tool.

However, because of its physical volume, the rotary disk does not allow for obtaining simple geometric shapes, without damaging the edge near the shape to be obtained on the sheet.

The waterjet cutting technology allows for directing a waterjet with a very high pressure (3000-4000 bar) onto the sheet in such a way to cut the sheet.

Such a technology allows for cutting with higher precision and easier adjustment, creating extremely complex shapes. Moreover, the waterjet cutting technology is a cold cutting operation and therefore it does not alter the physical and chemical properties of the material.

Considering that such a technology provides for the presence of conduits and pipes with a high-pressure water flow, the mounting of such a system on a supporting head is extremely complicated and difficult.

In view of the difficulties encountered when mounting and dismounting such a system on said supporting head, a machine dedicated to such a technology is used, wherein the waterjet cutting system is completely integral with the supporting head.

Evidently, it is extremely expensive to provide two different machines in the same workshop, which differ only in the means that are mounted on the supporting head.

As a solution to such a drawback, machines have been equipped with a supporting head where a rotary disk and a waterjet cutting nozzle are simultaneously and integrally mounted.

In spite of the fact that the simultaneous presence on the supporting head of the rotary disk and of the nozzle allows for combining the two technologies, such a solution is impaired by some drawbacks.

Evidently, a possible malfunctioning of either the disk or the nozzle, which are positioned on the operating unit, requires complicated replacement operations. In particular, such an operation is very complicated for what refers to the nozzle. In fact, as mentioned above, the use of the nozzle for high-pressure waterjet technology require extremely complex hydraulic connections because they must withstand high pressures. Therefore, the replacement and mounting of the waterjet system requires the presence of an expert of the field.

Moreover, an additional drawback of the machine according to the prior art is related with the hindrance caused by the non-working tool with respect to the movements of the working tool; more precisely, such a machine will work the sheets by alternately using only one of said devices. Accordingly, while one of the tools is working, the other tool is not working, representing an obstacle for the free independent movement of the working tool.

EP2998088 discloses a numerical control machine that can perform cutting operations, as well as milling or grinding operations on slabs of stone, marble and natural or synthetic material.

BRIEF SUMMARY OF THE INVENTION

A first purpose of the present invention is to overcome the drawbacks of the prior art, by providing a machine used for the working of sheets that is inexpensive, versatile and reliable.

A second purpose of the present invention is to disclose a machine that can use any suitable tool/technology according to the type of operation to be performed.

An additional purpose of the present invention is to disclose a machine where the replacement of tools/technology is very simple to perform.

These purposes are achieved according to the invention with the characteristics of the appended independent claim 1.

Advantageous embodiments appear from the dependent claims.

The machine with interchangeable tools according to the invention is defined by claim 1.

The advantages of the machine according to the invention are manifest, because the provision of male and female fast-coupling means allows for easily mounting and dismounting the working means with rotary tools and the waterjet cutting means in such a way that the machine of the invention can be used for all types of operations and requirements.

BRIEF DESCRIPTION OF THE SEVERAL VIEWS OF THE DRAWINGS

For the sake of clarity, the description of the machine with interchangeable tools according to the invention continues with reference to the attached drawings, which have a merely illustrative, not limiting value, wherein.

DETAILED DESCRIPTION OF THE INVENTION

Figure 1:
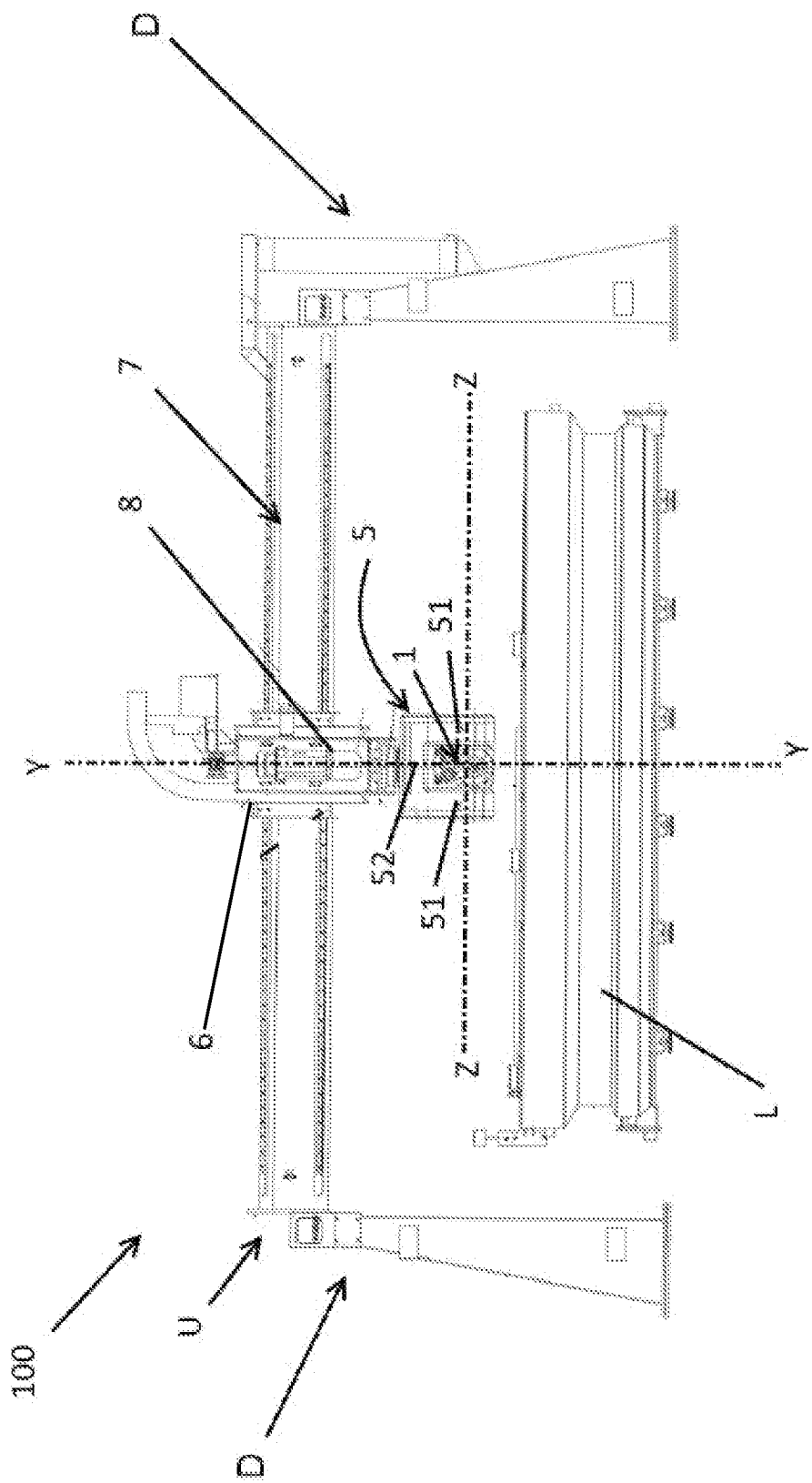
FIG. 1 is a side view of the machine according to the invention.
Figure 1A:
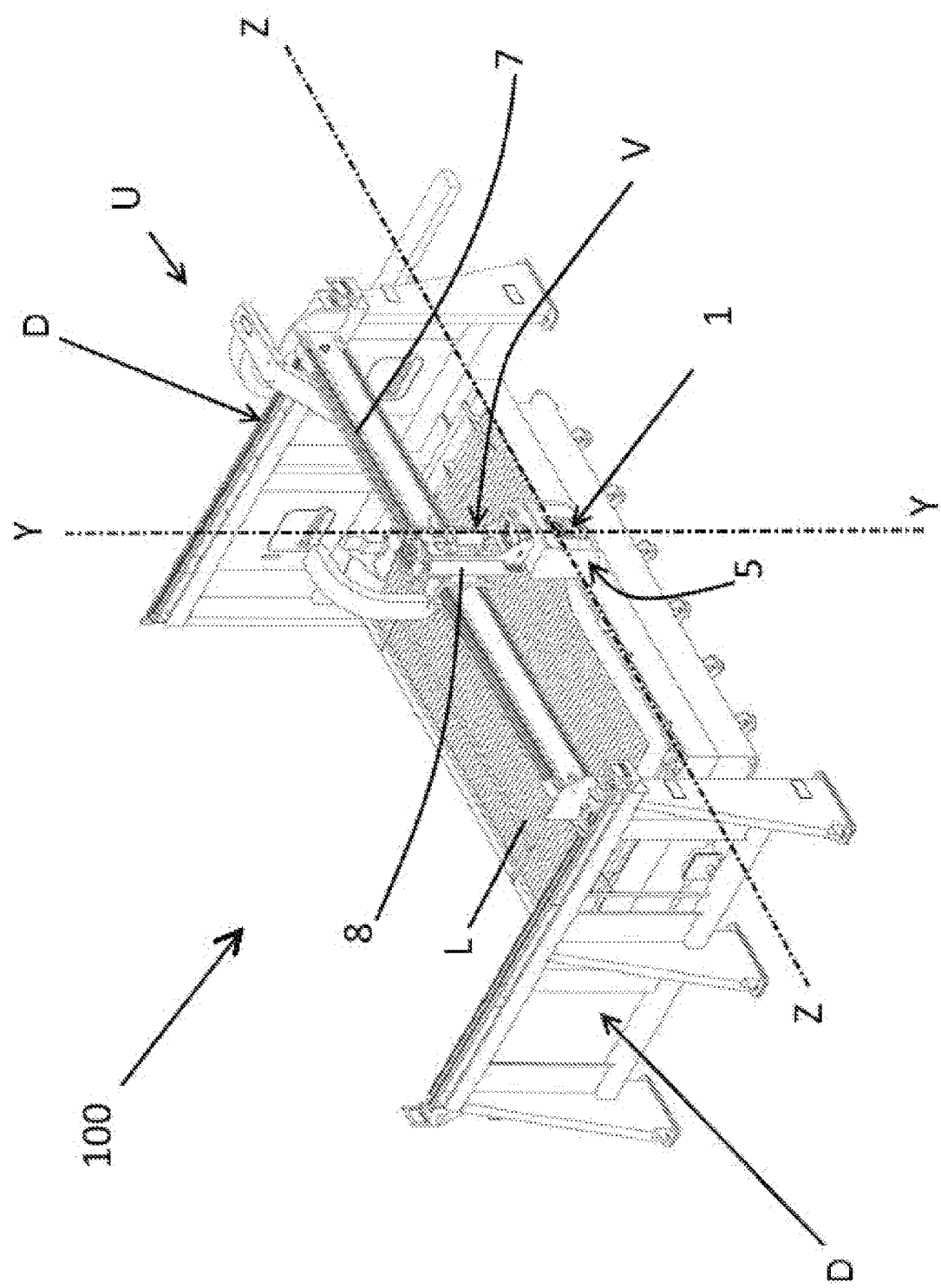
FIG. 1A is an axonometric top view of the machine according to the invention.

With reference to FIGS. 1 and 1A, a machine with interchangeable tools according to the invention is disclosed, which is generally indicated with reference numeral (100).

With reference to FIG. 1, the machine (100) comprises a supporting head (1) connected to a supporting frame (U).

Figure 3:
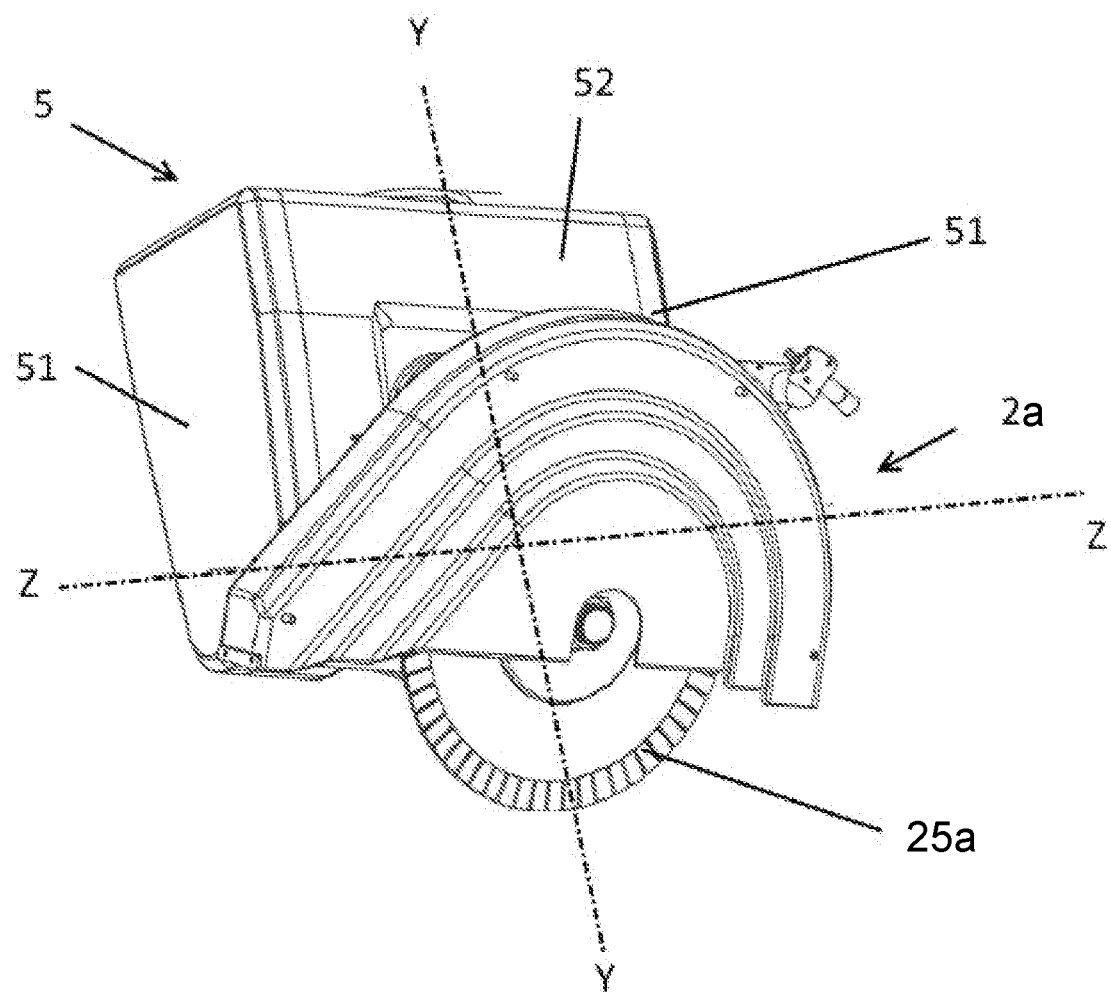
FIG. 3 is an axonometric view of the supporting head where the working means with rotary tools are connected.
Figure 7:
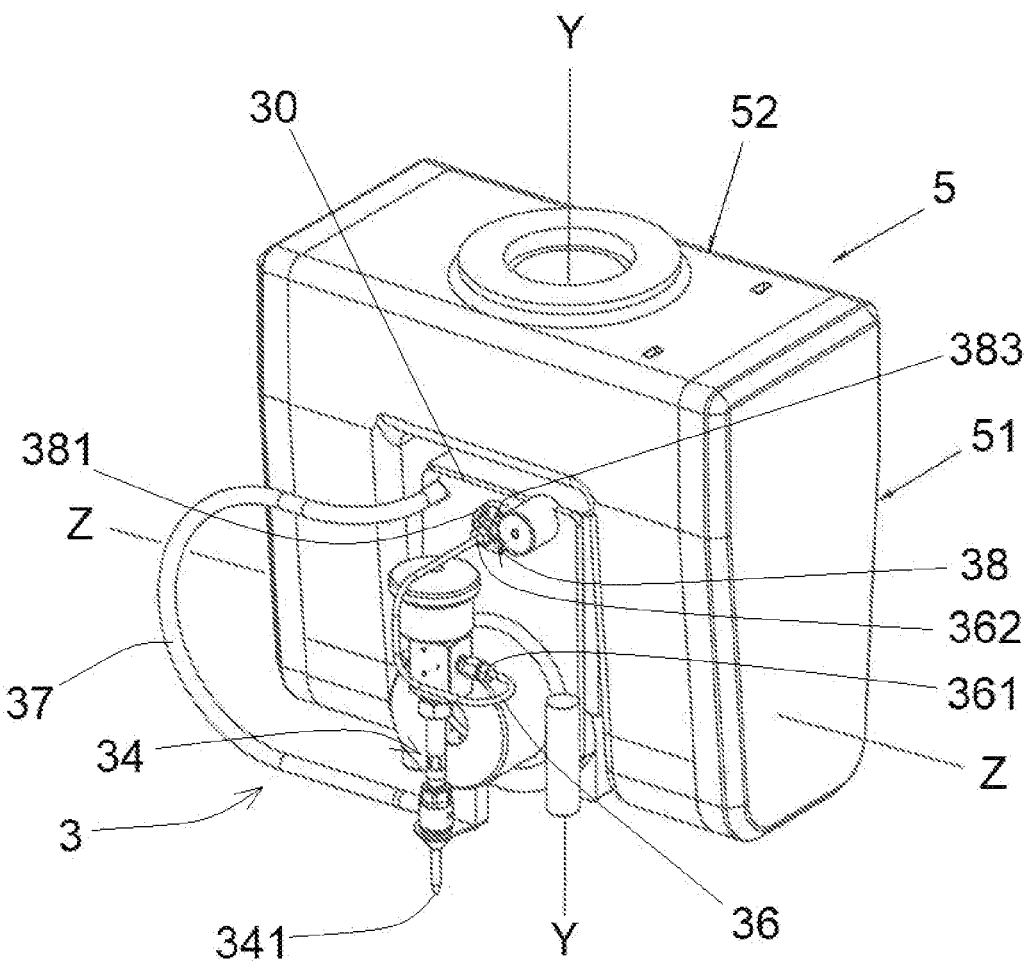
FIG. 7 is an axonometric view of the supporting head where the waterjet cutting means are connected.

With reference to FIGS. 3 and 7, the machine (100) of the invention comprises working device (2a) and waterjet cutter (3) that can be alternately used and connected to the supporting head (1).

With reference to FIGS. 2, 4, 9, 12 and 13, the machine (100) also comprises fast-coupling means (12, 13; 21, 31), which comprise a first and a second male fast-coupling means (21, 31) and a first and a second female fast-coupling means (12, 13).

Figure 2:
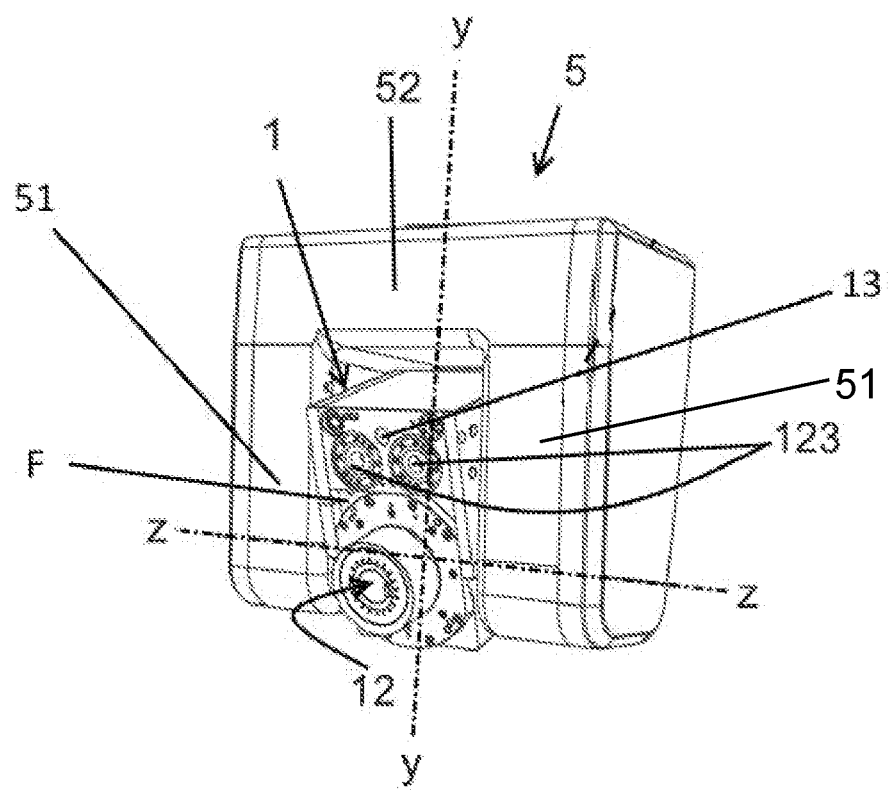
FIG. 2 is an axonometric view of the supporting head devoid of the working means with rotary tools and devoid of the waterjet cutting means.

As shown in FIG. 2, the first and second female fast-coupling means (12, 13) are disposed on the supporting head (1).

Figure 4:
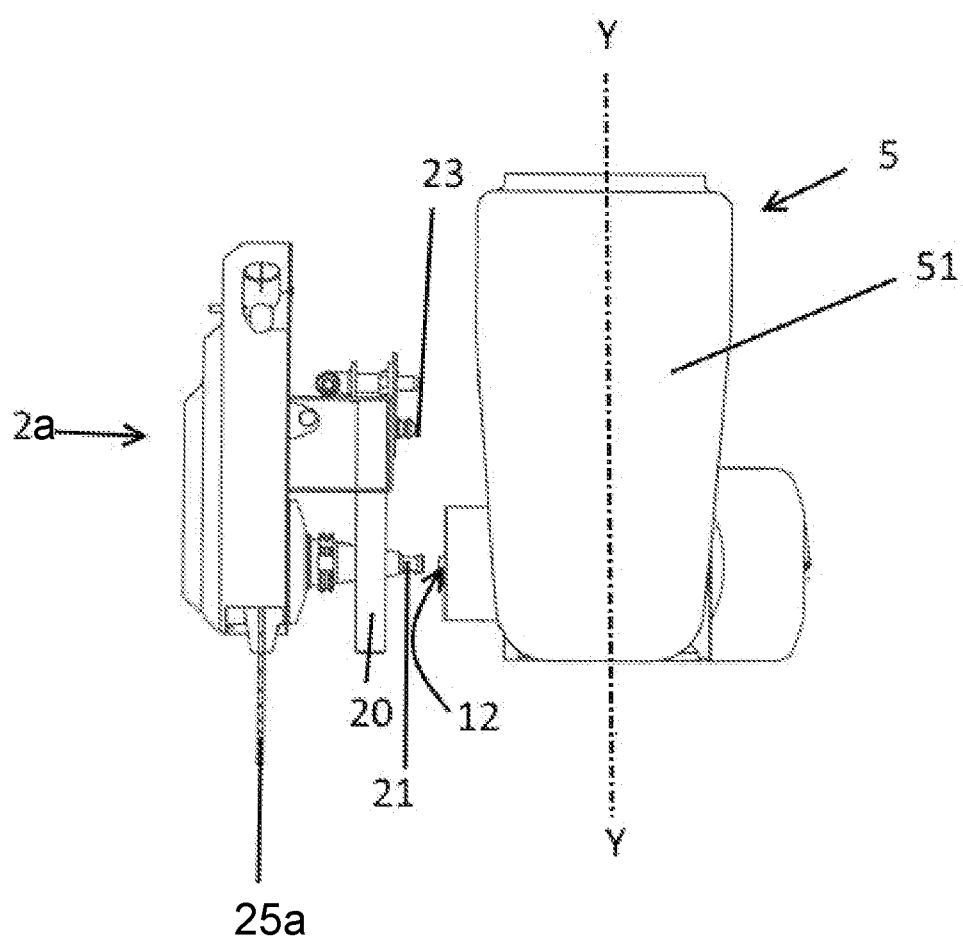
FIG. 4 is a side view that illustrates the working means with rotary tools in uncoupled position relative to the supporting head.

With reference to FIG. 4, the first male fast-coupling means (21) is disposed on said working device (2a) with rotary tools.

Figure 9:
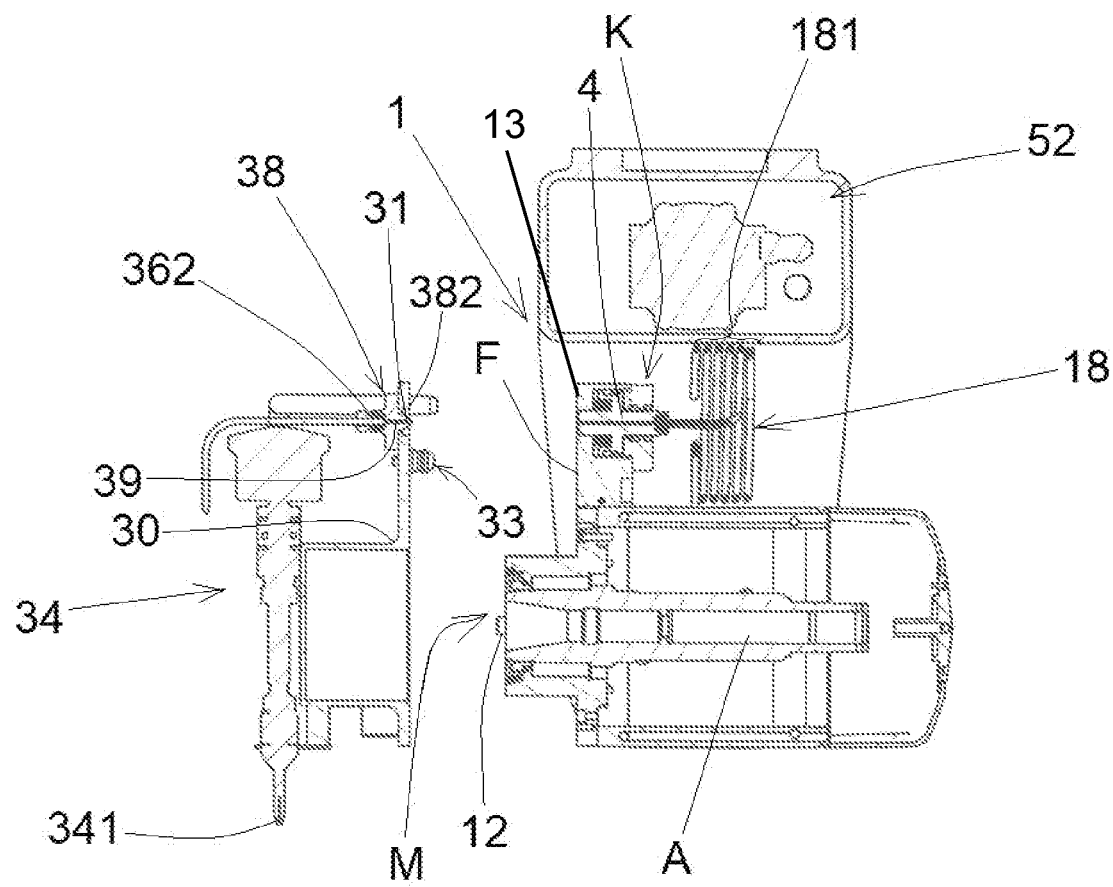
Figure 10:
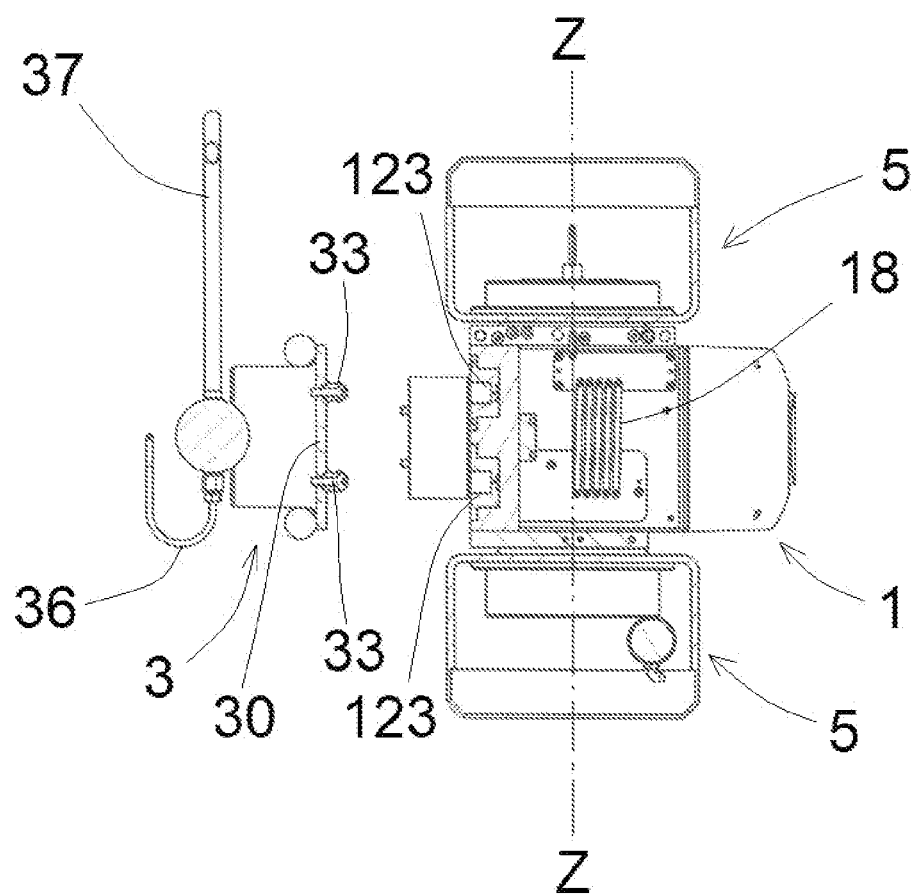
FIG. 10 illustrates the supporting head and the waterjet cutting means in uncoupled position, sectioned along a plane passing through the male and female centering and locking means.

With reference to FIG. 9, the second male fast-coupling means (31) is disposed on said waterjet cutter (3).

The female fast-coupling means (12, 13) are configured in such a way to allow for the alternate coupling with the first male fast-coupling means (21) or with the second male fast-coupling means (31).

With reference to FIG. 1, the supporting frame (U) has a gantry structure that comprises a pair of lateral frames (D) in parallel position that support a bar (7) in correspondence of a first and a second end of the bar (7).

The bar (7) is disposed above said work bench (L).

Moreover, the machine (100) comprises horizontal moving means that allow for moving the supporting head (1) along two directions that are parallel to the work bench (L) and mutually perpendicular; the machine (100) also comprises vertical moving means (V) that allow for moving the supporting head (1) along a perpendicular direction relative to the work bench (L).

According to a preferred embodiment, the horizontal moving means comprise a pair of guides disposed on said pair of lateral frames (D) and comprise a pair of slides connected to the bar (7) and disposed in correspondence of the ends of the bar (7), in such a way to move the bar (7) in parallel direction relative to the two lateral frames (D).

Moreover, the gantry structure comprises a trolley (8) that slides on said bar (7) along a horizontal axis, perpendicularly to the pair of lateral frames (D).

The horizontal moving means also comprise a guide provided on said bar (7) and slides provided on said trolley (8) in such a way to make the trolley (8) slide along the bar (7).

The machine (100) comprises a post (6) connected to the trolley (8).

According to a preferred embodiment, the vertical moving means (V) comprise an actuator capable of moving the post (6) along a vertical direction, more precisely closer to or farther from the work bench (L).

With reference to FIG. 2, the machine also comprises a U-shaped revolving frame (5).

Said revolving frame (5) comprises two parallel arms (51) and one transverse arm (52); said arms define a compartment.

The supporting head (1) is disposed in the compartment defined by the arms (51, 52) of the revolving frame (5); said supporting head (1) comprises an operating side (F) provided with the female fast-coupling means (12, 13).

More precisely, with reference to FIGS. 2 and 7, said revolving frame (5) is connected to the post (6) by means of first rotation means that allow for rotating the revolving frame (5) (and consequently the supporting head (1)) along a vertical axis (Y-Y) perpendicularly to the work bench (L), whereas the supporting head (1) is connected to the two arms

(51) of the revolving frame (5) by means of second rotation means that allow for rotating the supporting head (1) along an axis (Z-Z) that is inclined relative to the vertical axis (Y-Y).

Preferably, the axis (Z-Z) is perpendicular relative to the axis (Y-Y) and is therefore horizontal.

Figure 5:
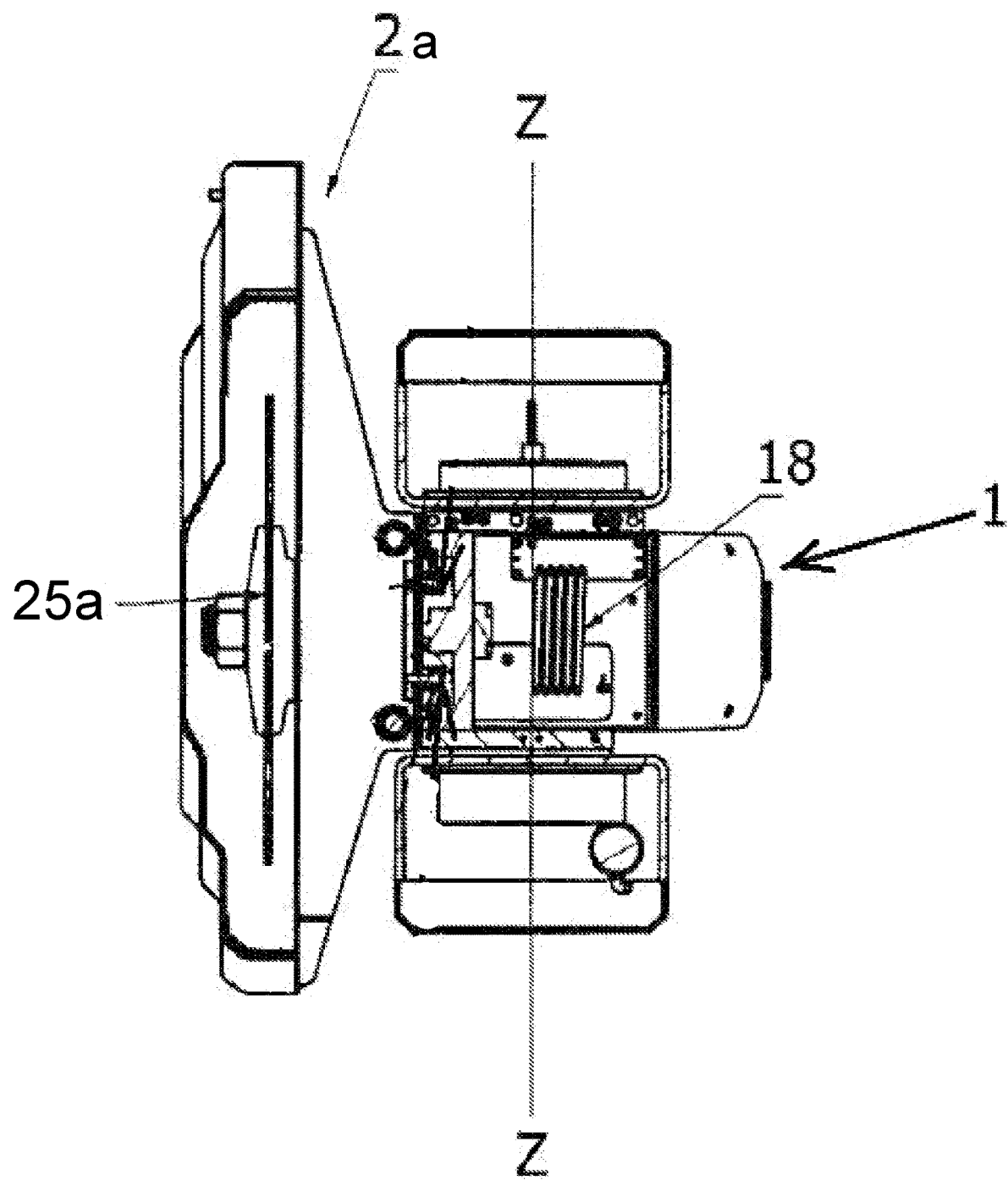
FIGS. 5 and 6 illustrate the supporting head and the working means of the rotary tools, respectively in coupled position and in uncoupled position, seen from above and sectioned along a plane passing through the male and female centering and locking means.

With reference to FIGS. 3 to 5, the working means with rotary tools (2) comprise a frame, which comprises a plate (20).

Figure 2A:
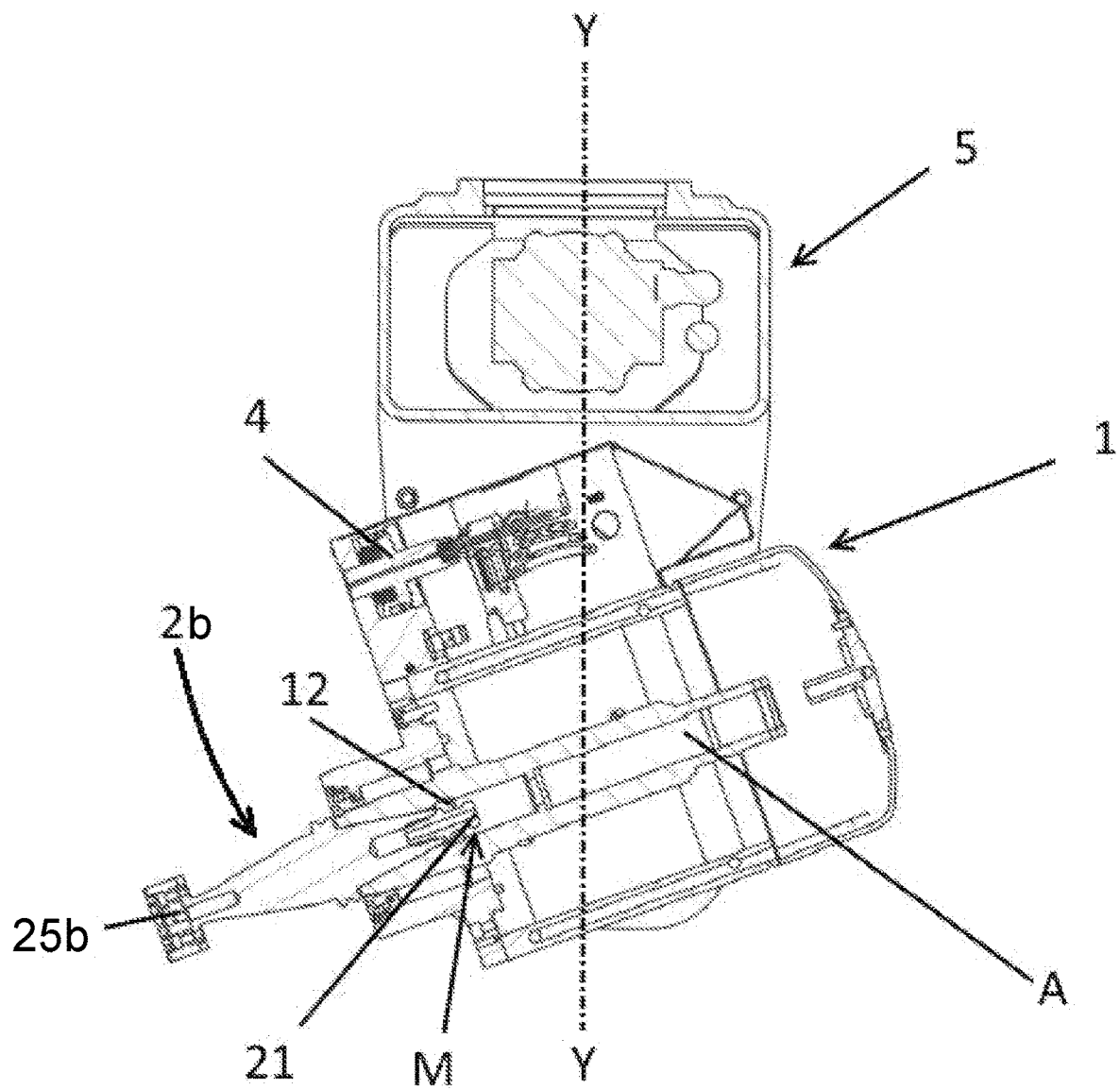
FIG. 2A is a side view of the supporting head and of the working means with rotary tools in coupled position, sectioned along a plane passing through the axis of rotation of the shaft.

With reference of FIG. 2A, the working device (2b) comprises a tool supported thereon.

According to an embodiment of the present invention, the tool consists in a disk (25a) used to cut a sheet, which is provided with a diamond section, as shown in FIGS. 3, 4 and 5.

Instead of being a cutting disk, the tool can also be a milling cutter (25b), as shown in FIG. 2A, or a brush, a polisher or the like, which are not shown in the appended figures.

With reference to FIG. 5A, the machine (100) comprises a motorized shaft (A) and a mandrel (M) connected to the shaft (A); the mandrel (M) and the shaft (A) are disposed on the supporting head (1).

The mandrel (M) is connected to the shaft (A) and comprises a central housing.

The first female fast-coupling means (12) comprises said central housing of the mandrel (M).

The first male fast-coupling means (21) consists in a pin that is configured in such a way to be inserted in said central housing of the mandrel (M) with conical coupling. The pin is integral with the tool (25a) and allows for transferring the rotation of the shaft (A) to the tool (25a) because of the coupling with the central housing of the mandrel (M).

It must be noted that the coupling between the central housing of the mandrel (M) and the pin is obtained automatically, without the need of keys or off-center pins for locking the pin with the central housing.

With reference of FIGS. 7 to 10, the waterjet cutter (3) comprise a frame, which comprises a plate (30).

The waterjet cutter (3) also comprise a nozzle (34), which comprises an outlet (341), a first conduit (36) and a second conduit (37); said first conduit (36) and said second conduit (37) end in said nozzle (34).

The first conduit (36) is suitable for receiving a water flow with very high pressure.

The second conduit (37) is suitable for receiving a flow of abrasive powder, such as sand; the abrasive power mixed with the high-pressure water that passes through the first conduit (36) increases the efficiency of the waterjet cutter (3).

The first conduit (36) comprises a first end (361) connected to the nozzle (34) and a second end (362) opposite to the first end (361).

The waterjet cutter (3) also comprise a fixing element (38).

Figure 12:
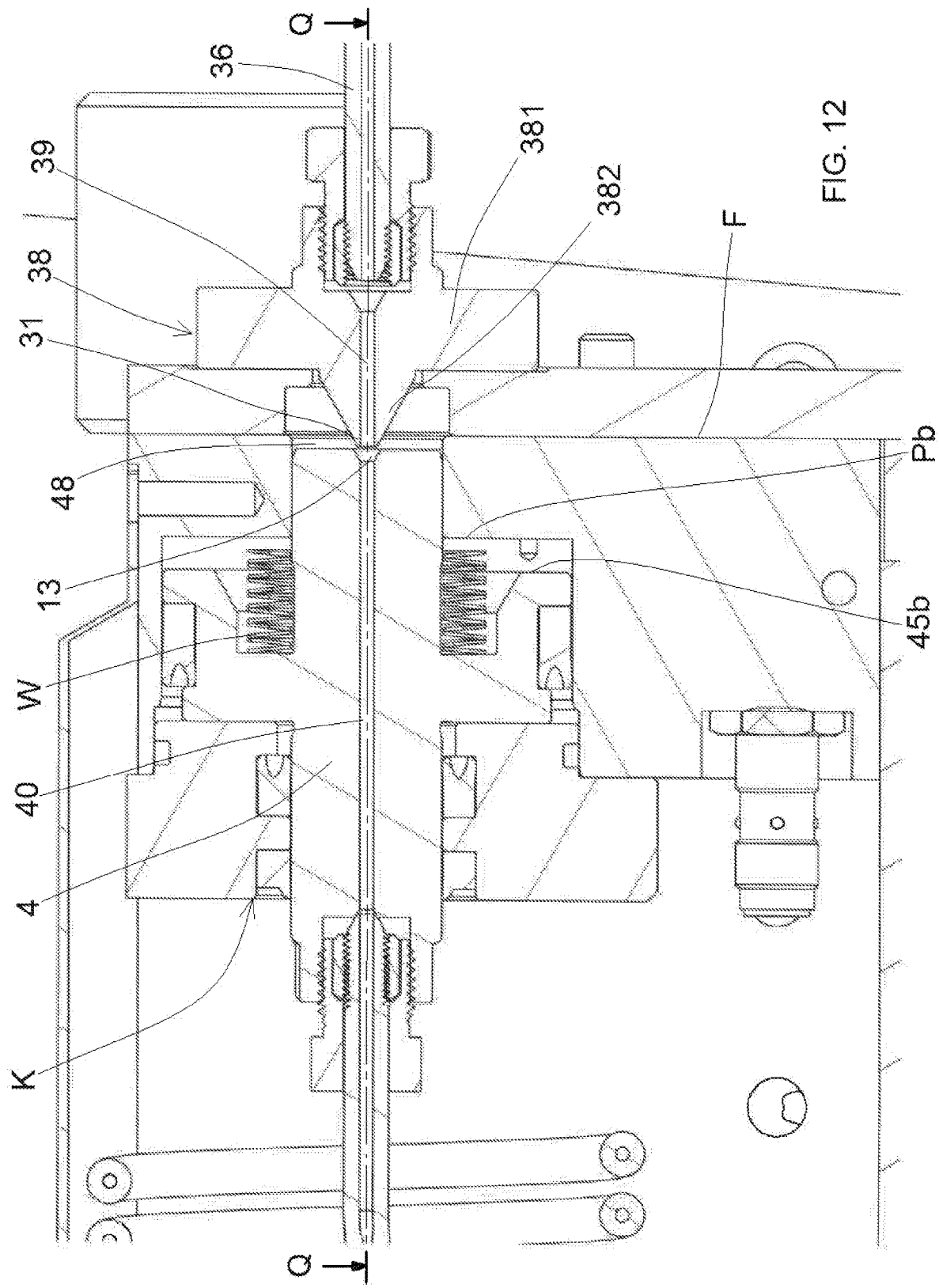
FIG. 12 is a side view of the hydraulic connection, sectioned along a plane passing through the axis Q-Q, wherein the mobile stem of the hydraulic connection is in its first position.
Figure 13:
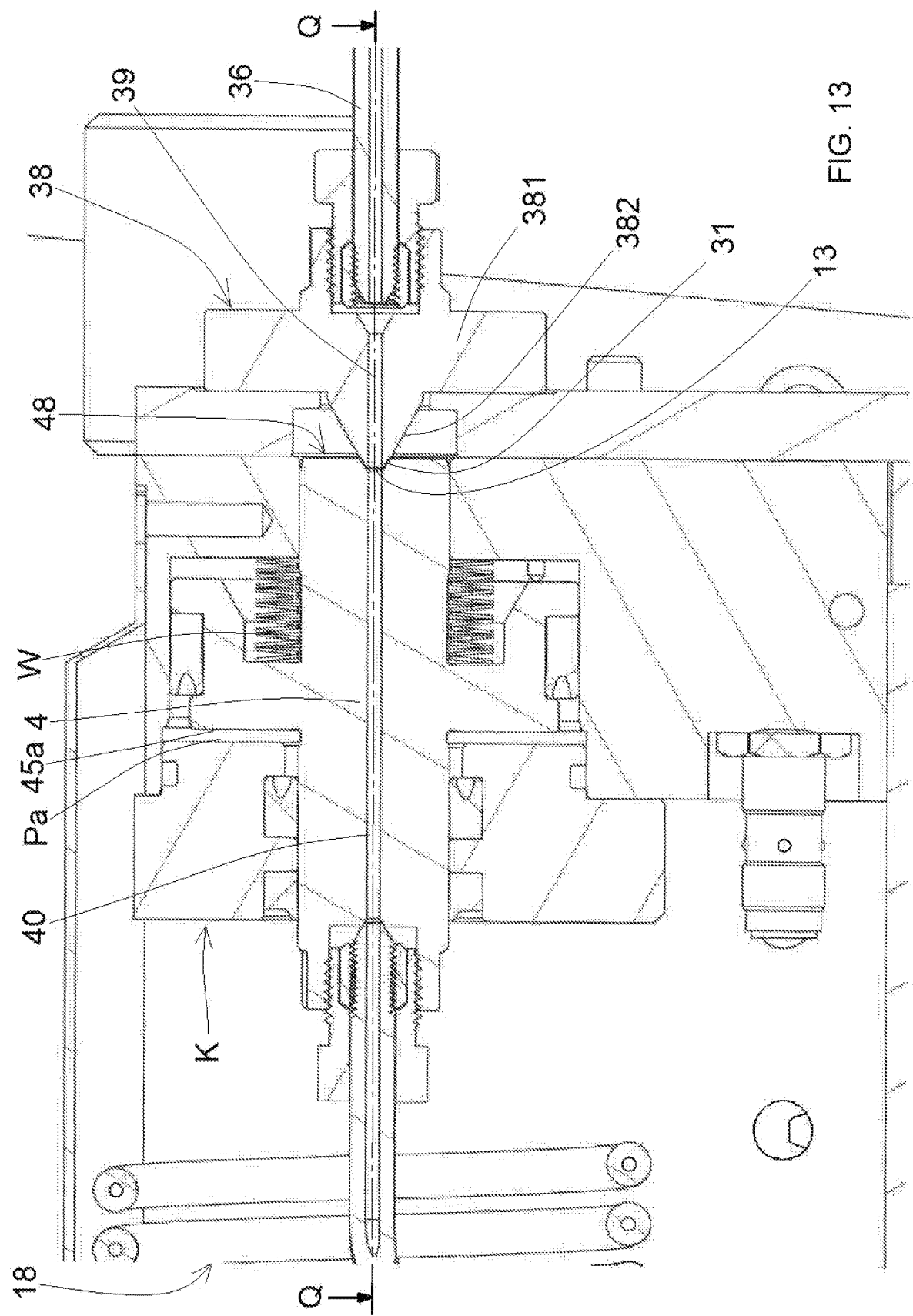
FIG. 13 is the same as FIG. 12, wherein the mobile stem of the hydraulic connection is in its second position.

With reference to FIGS. 7, 9, 12 and 13, the fixing element (38) comprises a central conical portion (382) (as shown in FIGS. 12 and 13), inserted in a hole provided in said plate (30), and a perimeter flange (381) with holes (383) where screws are inserted for firmly fixing the fixing element (38) on the plate (30).

The fixing element (38) comprises an axial conduit (39) that ends in the conical portion (382) on one side, and is connected to the second end of the first conduit (36) of the waterjet cutting means (3) on the other side.

Figure 8:
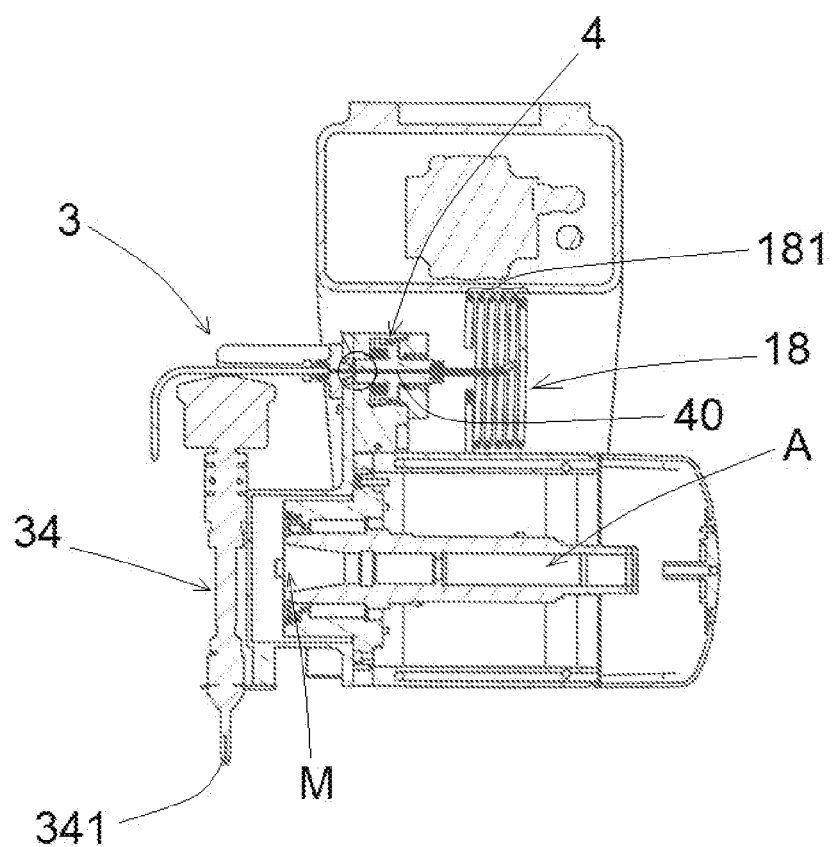
FIGS. 8 and 9 illustrate the supporting head and the waterjet cutting means, respectively in coupled position and in uncoupled position, seen from the side and sectioned along a plane passing through the second male and female fast-coupling means.

With reference to FIG. 8, the machine (100) comprises a hydraulic conduit (18) disposed inside the supporting head (1), which is suitable for receiving a flow of a high-pressure liquid.

The hydraulic conduit (18) comprises a portion (181) with a spiral direction.

Said hydraulic conduit (18) is suitable for being connected to a high-pressure hydraulic pump.

Figure 11:
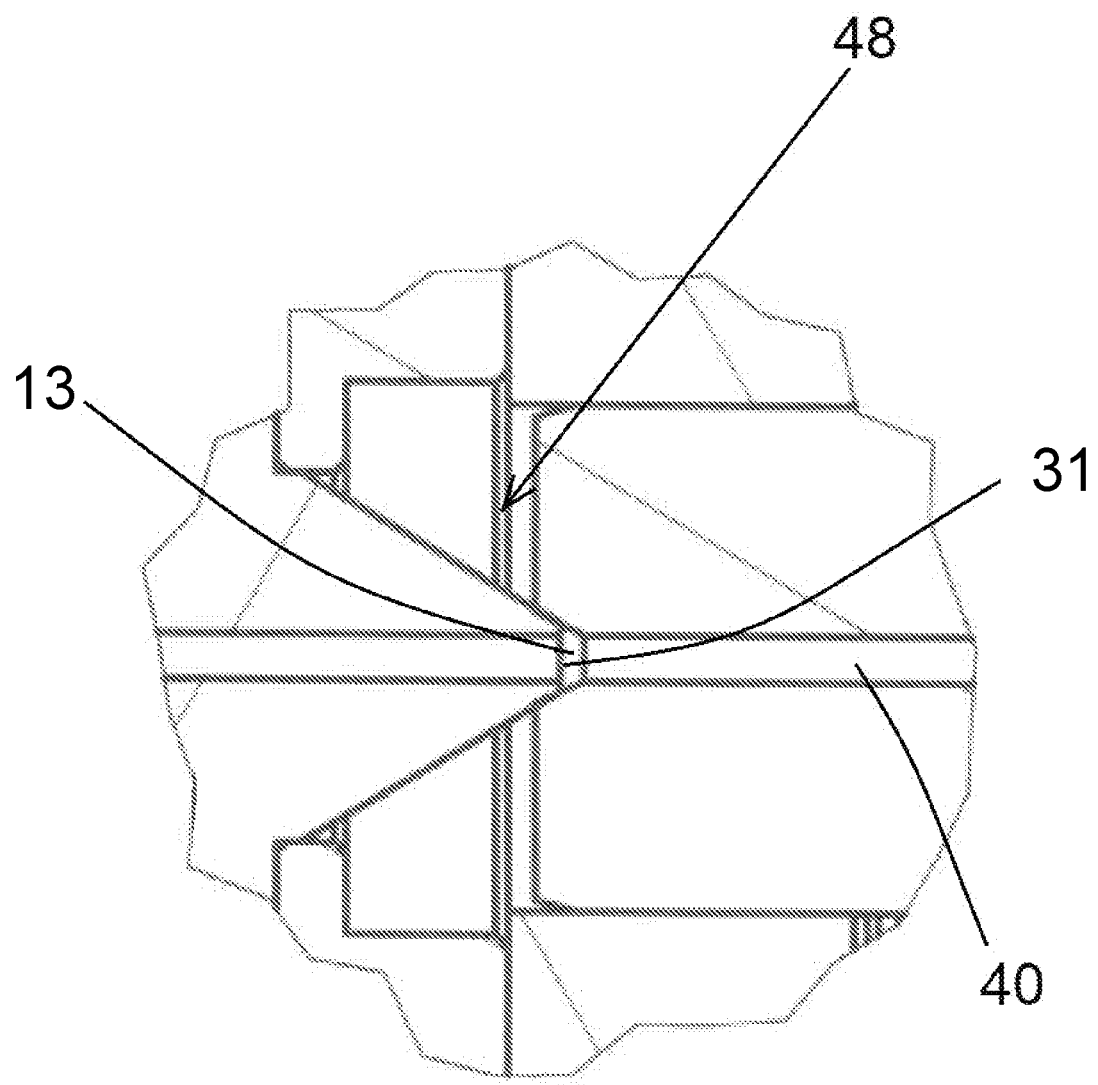
FIG. 11 is an enlarged view of the detail "O" of FIG. 8.

With reference to FIG. 11, the second female fast-coupling means (13) comprises a conical mouth. The second male fast-coupling means (31) comprises a conical insertion obtained in said conical portion (382) of the fixing element (38) and configured in such a way to be inserted in said conical mouth Preferably, the conical mouth and the conical insertion have a different inclination, which differs by approximately 2 degrees.

Advantageously, the conical mouth and the conical insertion are made of a metal material.

The machine (100) also comprises a hydraulic connection provided in said supporting head (1) downstream said hydraulic conduit (18).

Said hydraulic connection (K) comprises the conical mouth of the second female fast-coupling means (13) and an internal conduit (40) that puts the conical mouth in communication with the hydraulic conduit (18).

Preferably, said hydraulic connection (K) comprises a mobile stem (4) and a housing; said mobile stem (4) slides in said housing along an axis (Q-Q).

Said mobile stem (4) comprises a first end, which is connected to said hydraulic conduit (18), and a second end in opposite position relative to said first end.

Said housing comprises an opening (48) that ends externally on the supporting head (1) in correspondence of the operating side (F).

The housing is obtained in such a way that the travel of the mobile stem (4) is comprised between 0.5 mm and 1.5 mm, preferably 1 mm.

With reference to FIGS. 11 to 13, the conical mouth is obtained in said mobile stem (4) in correspondence of said second end; said internal conduit (40) is longitudinally obtained in said mobile stem (4) and extends from the first end to the second end.

The machine (100) comprises an oil-pressure system that allows for the sliding movement of the mobile stem (4) inside the housing between a first position, which is shown in FIG. 12, and a second position, which is shown in FIG. 13.

As shown in FIG. 12, when said mobile stem (4) is in said first position, the conical mouth is disposed in distal position relative to said mouth (48), whereas, as shown in FIG. 13, when said mobile stem (4) is in said second position, the conical mouth is disposed in proximal position relative to said mouth (48).

The oil-pressure system comprises a pump to adjust the pressure of a liquid contained inside the housing, in such a way to move the mobile stem (4) from its first position to its second position and vice versa.

With reference to FIGS. 12 and 13, the mobile stem (4) comprises an annular projection with a first stop surface (45a) and a second stop surface (45b), which are suitable for stopping against a first wall and a second wall (Pa, Pb) of the housing, in such a way to act as stop for the mobile stem (4) when said mobile stem is disposed in its first position and when said mobile stem is disposed in its second position.

With reference to FIGS. 12 and 13, according to an alternative embodiment of the invention, the machine (100)

comprises a spiral spring (W) disposed around said mobile stem (4) between said second stop surface (45b) and said second wall (Pb); said spiral spring (W) allows for returning the mobile stem (4) to its first position when the oil pressure system is not active.

The activation of the pump generates a pressure in the housing that pushes the mobile stem (4) towards the mouth (48) of the housing, thus firmly coupling the conical opening with the conical insertion.

More precisely, when the waterjet cutter (3) is mounted on the supporting head and the hydraulic pump is active, the hydraulic conduit (18), the internal conduit (40), the conical mouth and the conical insertion receive a water flow with very high pressure, which tends to detach the conical mouth and the conical insertion. On the contrary, the provision of the pump of the oil-pressure system permits to firmly keep the conical mouth stopped against the conical insertion, opposing the detachment force exerted by the high pressure between the conical mouth and the conical insertion, thus permitting the use of the waterjet cutter (3) when it is mounted on the supporting head (1).

The conical insertion and the conical mouth allow for aligning and joining the internal conduit (40) of the mobile stem (4) and the axial conduit (39) of the fixing element (38) when the waterjet cutter (3) is mounted on the supporting head (1) and the mobile stem (4) is in its second position.

Figure 6:
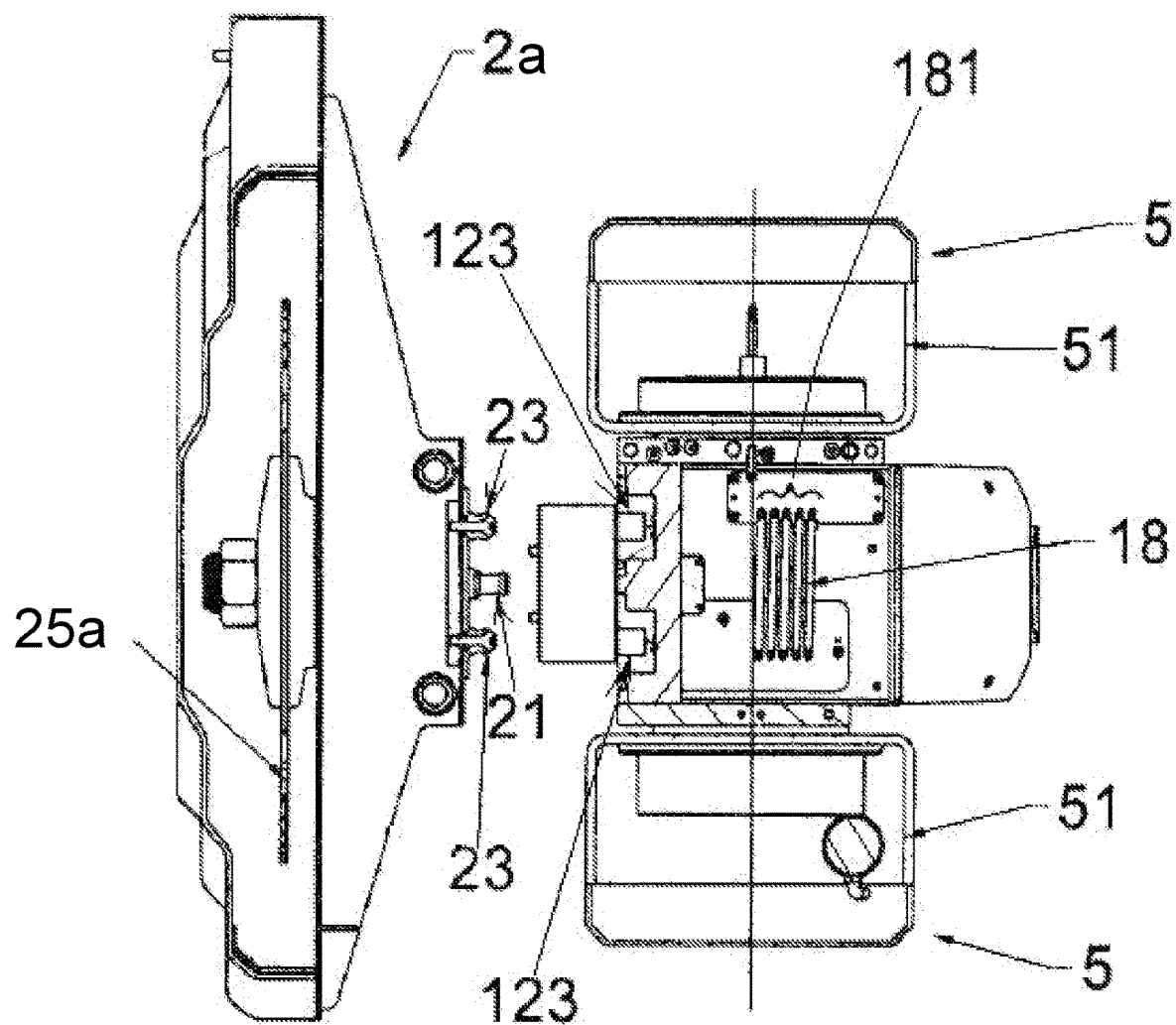

With reference to FIGS. 6 and 9, the machine (100) comprises first male centering and locking means (23) disposed in the working device (2a) with rotary tools, and second male centering and locking means (33) disposed in said waterjet cutter (3).

The machine (100) also comprises female centering and locking means (123) disposed on the operating side (F) of the supporting head (1).

The female centering and locking means (123) are configured in such a way to house the first male centering and locking means (23) and the second male centering and locking means (33).

With reference to FIGS. 4, 6 and 9, it can be noted that the first male centering and locking means (23) and the second male centering and locking means (33) have the same configuration.

According to a preferred embodiment, the male centering and locking means (23, 33) consist in two ball pins connected to the plate (20, 30), which comprise a body and an enlarged head.

The female centering and locking means (123) consist in two cylindrical housings with hydraulic locking, one for each ball pin of the male centering and locking means (23, 33).

Each cylindrical seat with hydraulic locking comprises a set of claws that compress the body of the ball pin by means of compressed air, thus locking the head of the ball pin inside the housing, in such a way to lock the plate (20, 30) with the supporting head (1).

Figure 14:
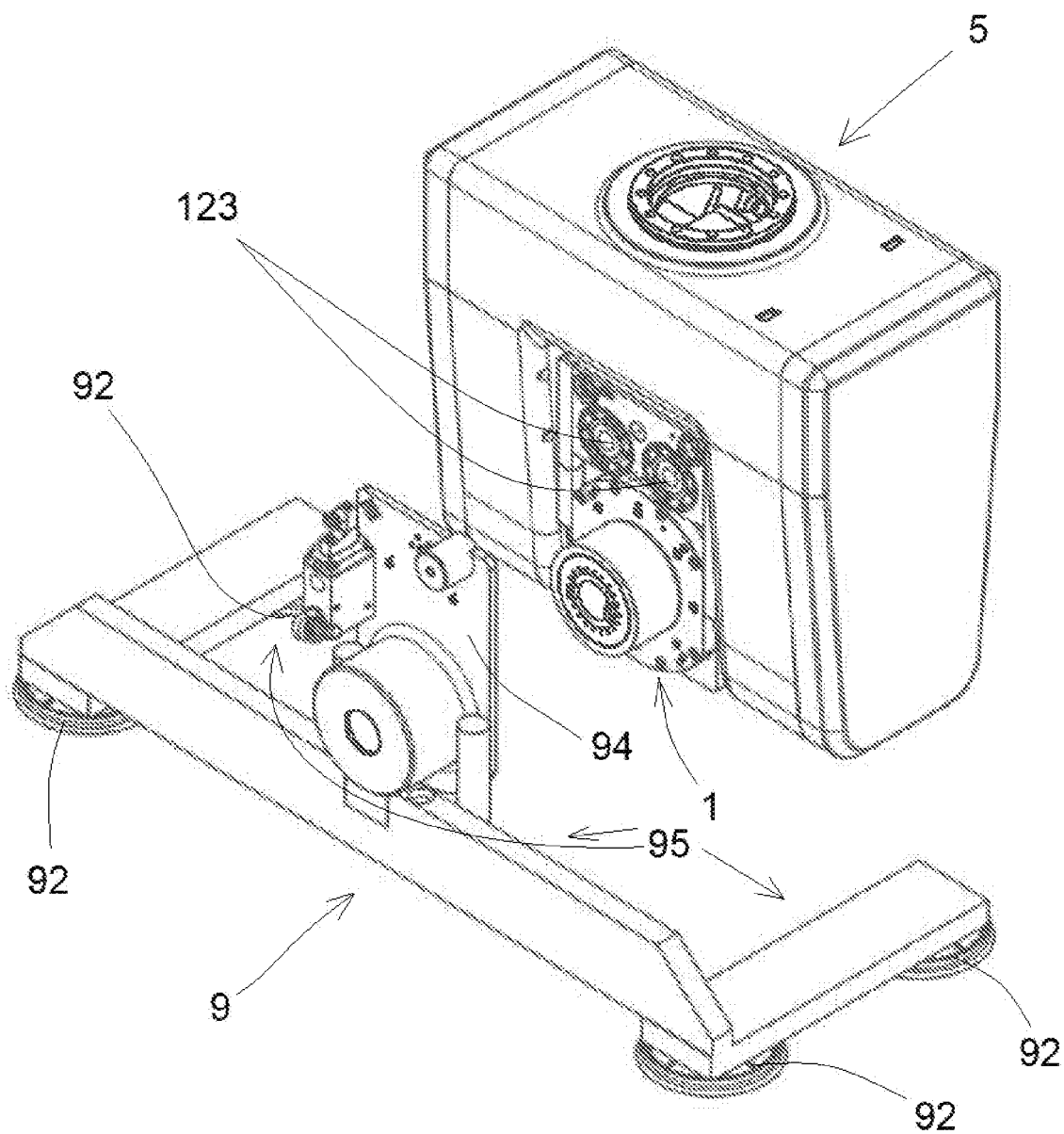
FIG. 14 is an axonometric view of the supporting head and of the removable frame in uncoupled position.
Figure 15:
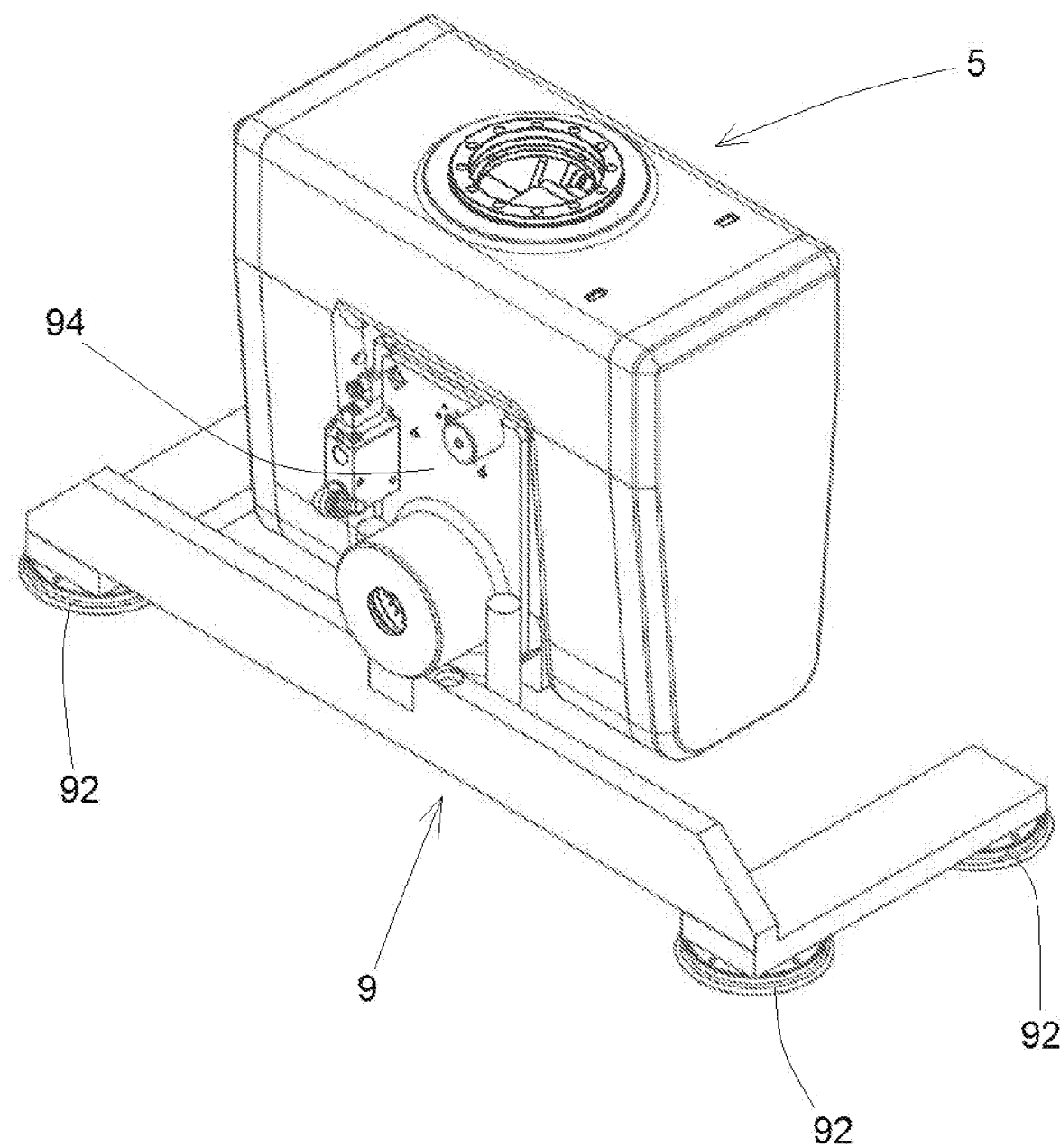
FIG. 15 is an axonometric view of the supporting head and of the removable frame in a coupled position.
Figure 16:
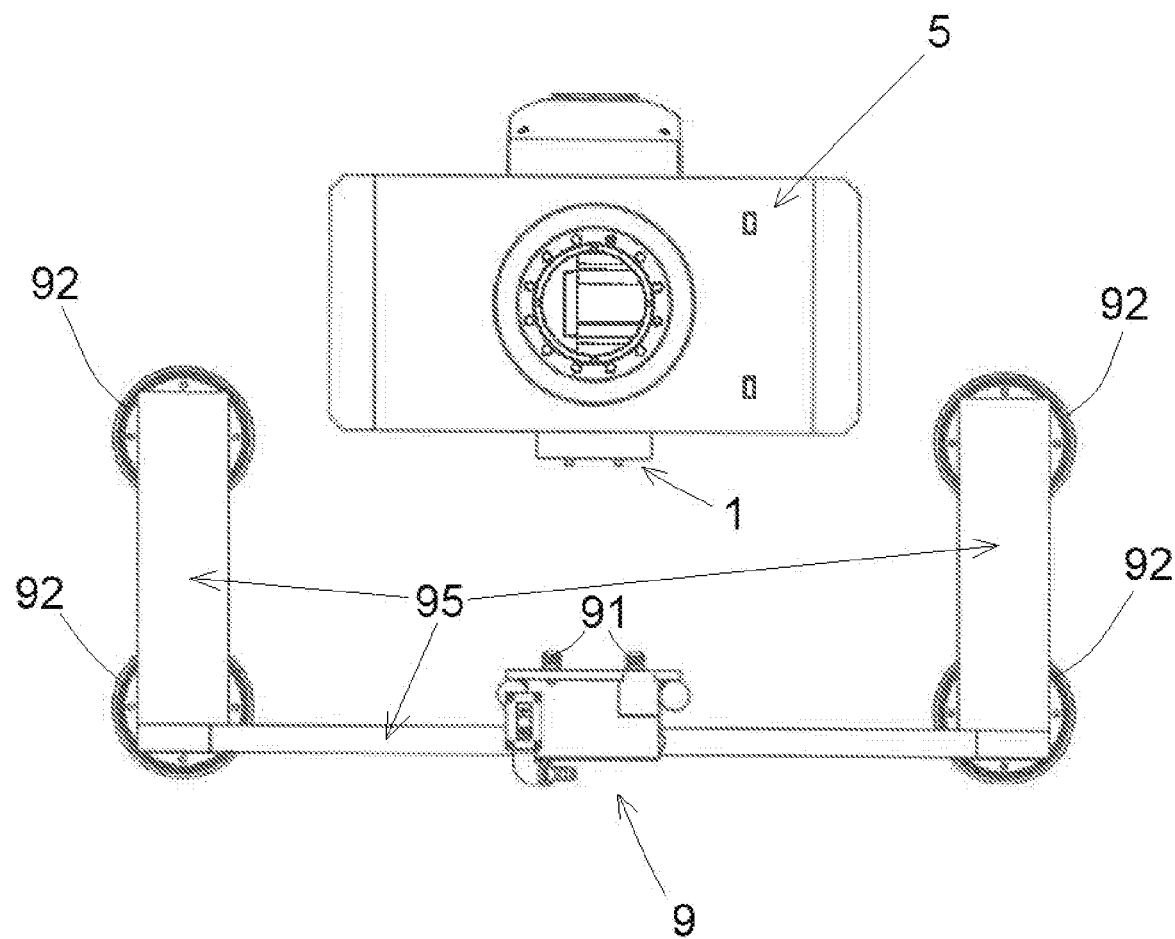
FIG. 16 is a top view of the supporting head and of the removable frame in uncoupled position.

With reference to FIGS. 14, 15 and 16 the machine (100) can be additionally provided with a removable frame (9) mounted on the supporting head (1) alternatively to the working device and/or to the waterjet cutter (3).

According to a preferred embodiment, said removable frame (9) comprises at least one suction cup (92) suitable for adhering, lifting and moving said sheet above the work bench (L).

Said removable frame (9) comprises a plate (94) and a support (95) whereon said at least one suction cup (92) is connected.

With reference to FIG. 14 said at least one suction cup (92) comprises four suction cups.

With reference to FIG. 16, said removable frame (9) comprises connection means (91), suitable for firmly connecting the removable frame (9) to said supporting head (1).

The connection means (91) are suitable for being inserted in said female centering and locking means (123).

With reference to FIG. 16, it can be noted that said connection means (91) have the same configuration as the first and the second male centering and locking means (23, 33). More precisely, the connection means (91) consist in two ball pins that are fixed on said plate (94) of the removable frame (9) and are configured in such a way to be inserted in the female centering and locking means (123) that consist in two cylindrical housings with hydraulic locking, as mentioned above.

Although not shown in the appended figures, the machine (100) may comprise a set of working device and\or a set of waterjet cutter (3), and\or a set of removable frames (9) which are disposed in the proximity of the work bench (L) and are installed on the supporting head (1) one at a time, according to the working operation to be performed by the machine (100).

With reference to FIGS. 7 to 13, it must be noted that the waterjet cutter (3) is locked on the supporting head (1) according to the steps of:
 disposing the supporting head (1) in the proximity of the waterjet cutter (3)
 using the second centering and locking means (33, 123) in order to obtain a correct mutual positioning;
 mounting the waterjet cutter (3) on the supporting head (1) by inserting the second male centering and locking means (33) in the female centering and locking means (123);
 locking the second male centering and locking means (33) in the female centering and locking means (123);
 disposing the mobile stem (4) of the hydraulic connection (K) in its second position, by activating the pump of the oil-pressure system, in such a way that the hydraulic conduit (18) is put in communication with the axial conduit (39) by means of the internal conduit (40); in particular, it is, necessary to make the mobile stem (4) of the hydraulic connection (K) slide inside the housing, along the axis (QQ) until the conical mouth of the second female fast-coupling means (13) is stopped against the conical insertion of the male fast-coupling means (31).

In view of the aforementioned description, the advantages of the machines (100) with interchangeable tools according to the invention are manifest.

In fact, the machine (100) of the invention allows for considering the waterjet cutting means (3) as any other type of working means. Consequently, the waterjet cutter (3) can be mounted/dismounted in a very simple way to/from the machine (100) and can be disposed in a storage station, without requiring the intervention of an expert of the field.

The special configuration of the conical insertion and of the conical mouth, as well as the provision of the mobile stem (4) of the hydraulic insertion (K) that slides between the first position and the second position generate a hydraulic junction at very high pressure (up to 4000 bar) that does not require any complicated manual operations when the waterjet cutter (3) is mounted on the supporting head (1) or when the waterjet cutter (3) is dismounted from the supporting head (1). The activation of the pump of the oil-pressure system allows for firmly maintaining the conical mouth in contact with the conical insertion, thus joining the hydraulic conduit (18) and the axial conduit (39) automatically and firmly.

Moreover, because of the provision of the moving and rotating means and of the easy mounting and dismounting of the working device and of the waterjet cutter (3), it is possible to obtain a machine (100) that is extremely versatile and suitable for performing any type of working operations, and for obtaining a finished sheet using only one machine (100).

Additionally, the possibility of mounting the removable frame (9) provided with at least one suction cup (92) allows for moving and positioning the sheet on the work bench (L) easily.

In view of the above, it appears clear that a machine (100) according to the invention is extremely functional because of its numerous applications, which include cutting, milling, polishing and the like.

It must be noted that, although in the aforementioned embodiment of the machine (100) according to the invention, the male fast-coupling means (21, 31) are disposed on the working device with rotary tools and on the waterjet cutter (3), whereas the female fast-coupling means (12, 13) are disposed on the supporting head (1), according to an alternative embodiment, the female fastcoupling means (12, 13) can be disposed on the working device and on the waterjet cutter (3), and the male fastcoupling means (21, 31) can be disposed on the supporting head (1) without changing the operation mode and without altering the characteristics of the machine (100) according to the invention.

Likewise, according to an additional embodiment, the male centering and locking means (23, 33) can be disposed on the supporting head (1), and consequently the female centering and locking means (123) can be disposed on the working device, or on the water cutter (3).

Numerous variations and modifications can be made to the present embodiment of the invention, which are within the reach of an expert of the field, falling in any case within the scope of the invention as disclosed by the appended claims.

I claim:

1. A combination including an apparatus for working sheet material and including a plurality of took selectively attachable to the apparatus,
the apparatus comprising:
a supporting frame; and
a supporting head connected to said supporting frame, a first female coupler and a second female coupler being disposed on said supporting head;
the plurality of tools comprising:
a working device including a first rotary tool, a first male coupler being disposed on said working device;
a waterjet cutter adapted to be positioned above the sheet material, a second male coupler being disposed on said waterjet cutter;
wherein said first female coupler and said second female coupler being configured so as to alternately permit coupling with said first male coupler or with said second male coupler, said supporting head having a shaft and a mandrel, the mandrel being connected to said shaft, said first female coupler comprising the mandrel, said first male coupler having a pin adapted to be inserted into and coupled with the mandrel.

2. The combination of claim 1, wherein said second female coupler has a conical mouth, said second male coupler having a conical insert adapted to be inserted inside the conical mouth.

3. The apparatus of claim 1, wherein the plurality of tools further comprising:
a removable frame mountable on said supporting head, said removable frame having a connector that connects said removable frame to said supporting frame.

4. The apparatus of claim 1, wherein the plurality of tools further comprising:
a removable frame having a connector that connects said removable frame to said supporting frame.

5. The apparatus of claim 1, further comprising:
a first male centering and locking device disposed on the working device;
a second male centering and locking device disposed on said waterjet cutter; and
a female centering and locking device disposed in said supporting head, said female centering and locking device alternately housing said first male centering and locking device and said second male centering and locking device.

6. The apparatus of claim 5, said first male centering and locking device and said second male centering and locking device having identical configurations.

7. The apparatus of claim 5, wherein the plurality of tools further comprising:
a removable frame having a connector that connects said removable frame to said supporting frame.

8. The apparatus of claim 5, wherein the plurality of tools further comprising:
a removable frame mountable on said supporting head, said removable frame having a connector that connects said removable frame to said supporting frame.

9. The apparatus of claim 8, wherein the connector is insertable in said female centering and locking device.

10. A combination including an apparatus for working sheet material and including a plurality of took selectively attachable to the apparatus,
the combination apparatus comprising:
a supporting frame; and
a supporting head connected to said supporting frame, a first female coupler and a second female coupler being disposed on said supporting head;
the plurality of tools comprising:
a working device including a first rotary tool, a first male coupler being disposed on said working device;
a waterjet cutter adapted to being positioned above the sheet material, a second male coupler being disposed on said waterjet cutter;
wherein said first female coupler and said second female coupler being configured so as to alternately permit coupling with said first male coupler or with said second male coupler, wherein said second female coupler has a conical mouth, said second male coupler having a conical insert adapted to be inserted inside the conical mouth;
a hydraulic conduit disposed inside the supporting head and adapted to receive a high-pressure liquid;
a hydraulic connection downstream of said hydraulic conduit, said hydraulic connection comprising the conical mouth of said second female coupler; and
an internal conduit in communication with the conical mouth and with said hydraulic conduit.

11. The apparatus of claim 1, wherein the conical mouth and the conical insert are each formed of a metal material.

12. The apparatus of claim 10, wherein said hydraulic connection has a mobile stem and a housing, the conical mouth and said internal conduit formed on the mobile stem, the housing having an opening, said mobile stem being slidable between a first position and a second position, the conical mouth being distal from the opening in the first position, the conical mouth being proximal to the opening in the second position.

\* \* \* \* \*